US008990560B2

(12) United States Patent
Massey et al.

(10) Patent No.: US 8,990,560 B2
(45) Date of Patent: Mar. 24, 2015

(54) MULTIPLE INDEPENDENT LEVELS OF SECURITY (MILS) HOST TO MULTILEVEL SECURE (MLS) OFFLOAD COMMUNICATIONS UNIT

(75) Inventors: Richard F. Massey, Warson Woods, MO (US); William E. Bond, St. Louis, MO (US); Gregg E. Franke, St. Charles, MO (US); Patrick A. Pekkarinen, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 451 days.

(21) Appl. No.: 13/163,067

(22) Filed: Jun. 17, 2011

(65) Prior Publication Data

US 2012/0324222 A1    Dec. 20, 2012

(51) Int. Cl.
| H04L 29/06 | (2006.01) |
| G06F 7/04 | (2006.01) |
| G06F 15/16 | (2006.01) |
| G06F 17/30 | (2006.01) |
| G06F 12/00 | (2006.01) |
| G06F 12/14 | (2006.01) |
| G06F 13/00 | (2006.01) |
| G06F 7/00 | (2006.01) |
| G06F 3/06 | (2006.01) |
| H04W 12/00 | (2009.01) |
| H04W 12/08 | (2009.01) |
| G06F 21/57 | (2013.01) |

(52) U.S. Cl.
CPC .............. *H04L 69/12* (2013.01); *G06F 3/0658* (2013.01); *H04W 12/00* (2013.01); *H04W 12/08* (2013.01); *G06F 21/57* (2013.01); *H04L 63/105* (2013.01)

USPC .................................. 713/166; 726/4; 726/21

(58) Field of Classification Search
CPC ...... G06F 3/0658; G06F 21/57; H04W 12/00; H04W 12/08
See application file for complete search history.

(56) References Cited

U.S. PATENT DOCUMENTS

| 7,076,803 B2 * | 7/2006 | Bruton et al. .................... 726/23 |
| 7,441,119 B2 * | 10/2008 | Brabson et al. ............... 713/164 |
| 7,607,011 B1 | 10/2009 | Johnson et al. |
| 7,681,036 B1 | 3/2010 | Zuber et al. |

(Continued)

FOREIGN PATENT DOCUMENTS

GB    2472726 A    12/2009

OTHER PUBLICATIONS

United States Patent and Trademark Office, Office Action for U.S. Appl. No. 12/137,668 dated Jan. 14, 2011, 16 pages.

(Continued)

*Primary Examiner* — Azizul Choudhury
(74) *Attorney, Agent, or Firm* — Armstrong Teasdale LLP

(57) ABSTRACT

Systems and methods for use in secure network communication. A physical network interface receives a network packet associated with a security level. The network packet is transmitted from the physical network interface to a security policy component. The network packet is routed to a stack offload engine by the security policy component based on a network address associated with the network packet and the security level associated with the network packet. The network packet is provided by the stack offload engine to a software application via trusted memory interface that transfers the packet to a memory portion of a plurality of memory portions. The memory portion corresponds to the security level.

22 Claims, 6 Drawing Sheets

(56) References Cited

U.S. PATENT DOCUMENTS

| | | |
|---|---|---|
| 7,779,254 B1 | 8/2010 | Crosmer et al. |
| 7,991,008 B2 * | 8/2011 | Winter .................... 370/474 |
| 2003/0105953 A1 * | 6/2003 | Brabson et al. ............. 713/151 |
| 2003/0105979 A1 | 6/2003 | Itoh et al. |
| 2004/0199808 A1 * | 10/2004 | Freimuth et al. ................. 714/4 |
| 2007/0127417 A1 | 6/2007 | Kalika |
| 2008/0008205 A1 * | 1/2008 | Jung et al. ................... 370/419 |
| 2009/0319787 A1 * | 12/2009 | Price .......................... 713/166 |
| 2009/0323682 A1 * | 12/2009 | Winter ........................ 370/389 |

OTHER PUBLICATIONS

United States Patent and Trademark Office, Office Action for U.S. Appl. No. 12/137,668 dated Jun. 17, 2011, 12 pages.

Combined Search and Examination Report of UK Application No. GB1210742.1; Dec. 5, 2012; 5 pages.

\* cited by examiner

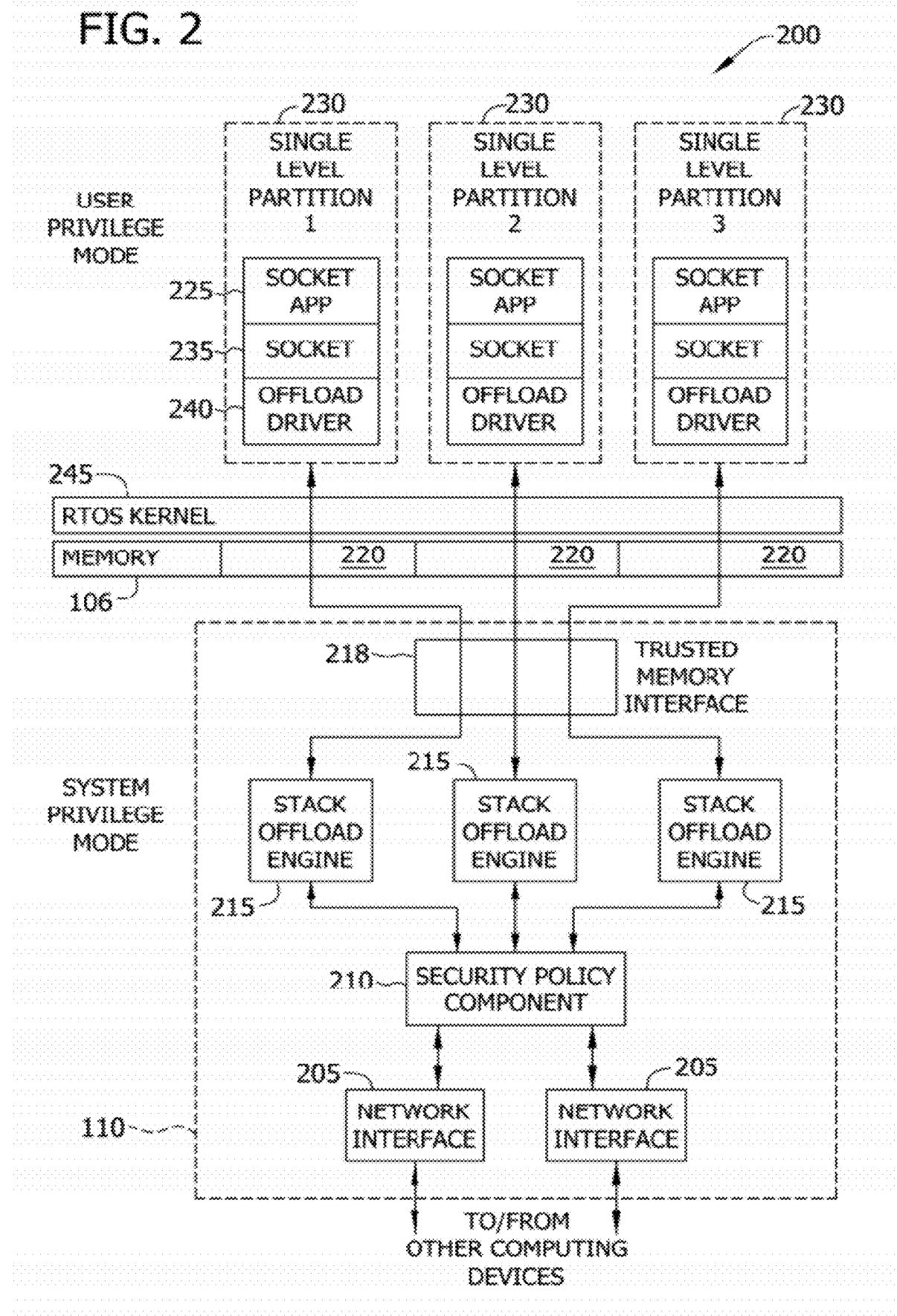

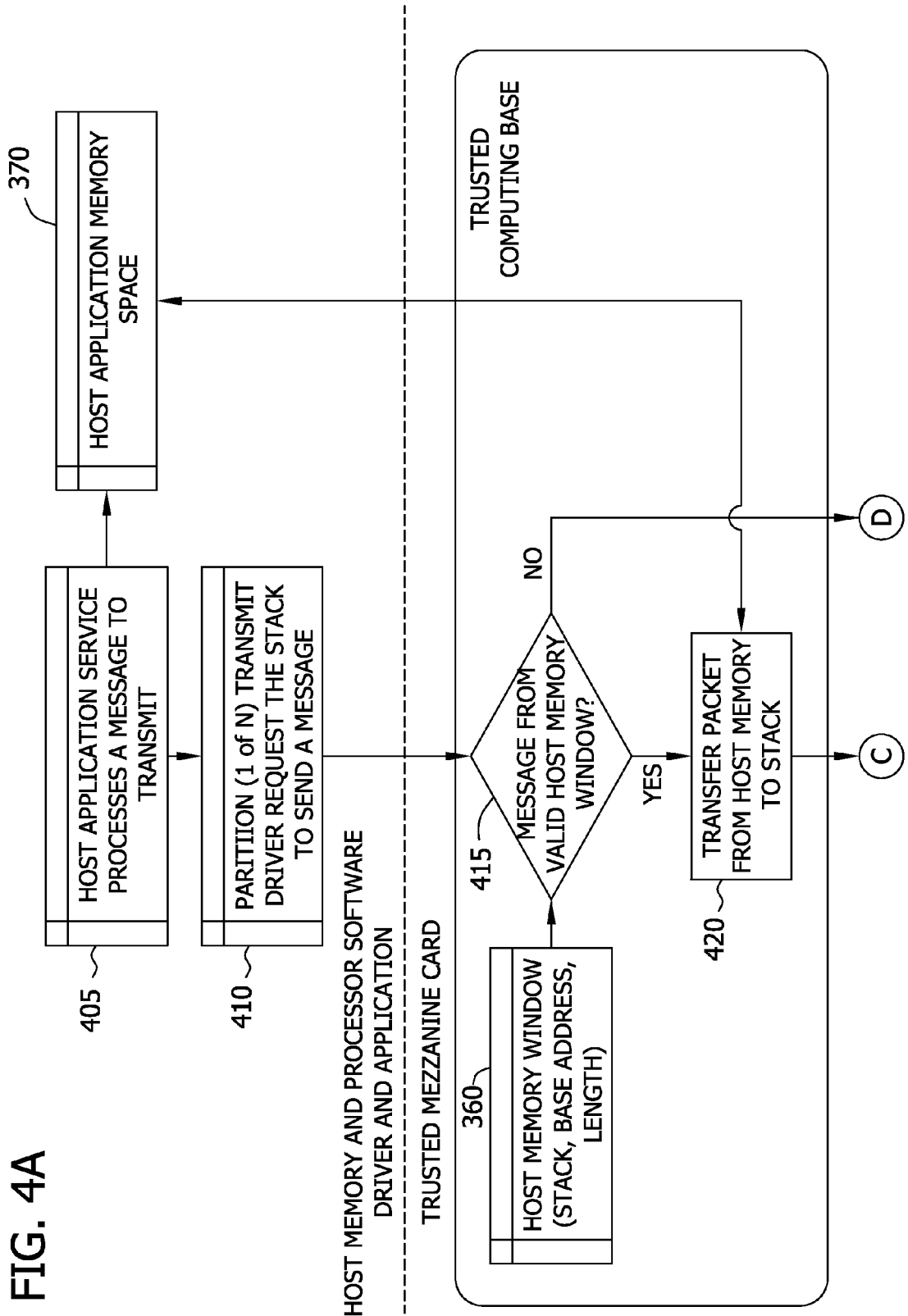

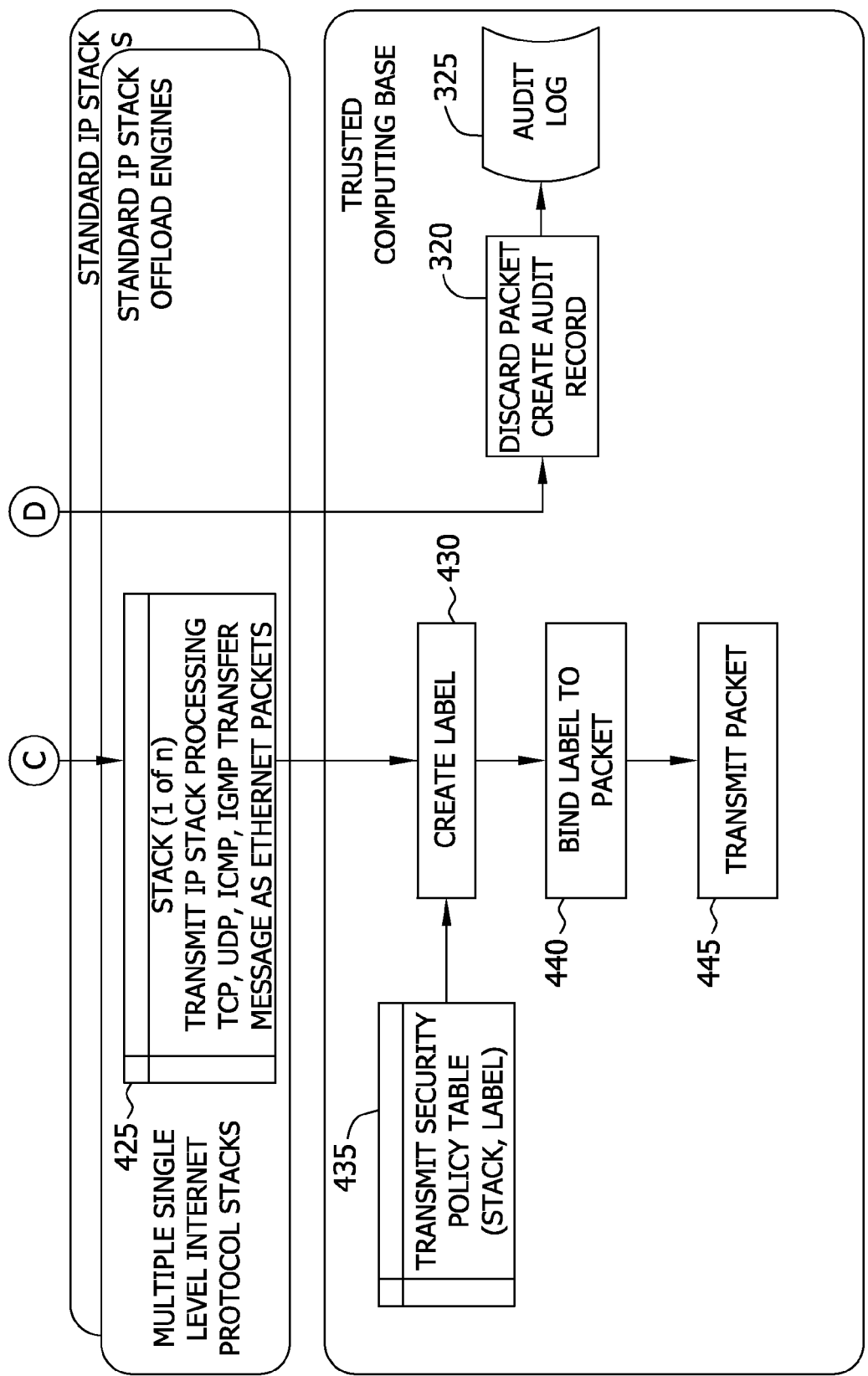

MULTIPLE INDEPENDENT LEVELS OF SECURITY (MILS) HOST TO MULTILEVEL SECURE (MLS) OFFLOAD COMMUNICATIONS UNIT

STATEMENT REGARDING FEDERALLY SPONSORED RESEARCH & DEVELOPMENT

This invention was made with Government support. The government has certain rights in this invention.

BACKGROUND

The field of the disclosure relates generally to network communication and, more specifically, to systems and methods for use in secure network communication.

In at least some known secure network communication systems, processor-to-wire latency and processor performance are adversely affected due to an approach of applying security labels within application software. For example, a memory separation policy for a multiple independent levels of security (MILS) real-time operating system (RTOS) may be based on highly robust and trusted memory separation techniques. As such, a multilevel secure (MLS) network stack may be required to enforce the security separation based on the memory space at the host interface and a MLS label at the wire interface.

However, network stacks are relatively large and costly to modify, test, and evaluate for correctness and do not support multiple separate interfaces. Additional network stack protocols are ever-evolving, but achieving protocol adaptability in a manner that affects the security certification for separation may introduce significant testing and/or certification costs. Therefore, an MLS stack may not represent a viable approach for a system required to accommodate the latest network stack protocols as well as provide highly robust security.

BRIEF DESCRIPTION

In one aspect, a system for use in secure network communication is provided. The system includes a physical network interface, a memory device, a plurality of stack offload engines coupled to the memory device, and a security policy component coupled to the physical network interface and the stack offload engines. The physical network interface is configured to communicate with one or more computing devices via a network. The memory device includes a plurality of memory portions, and each memory portion corresponds to one security level of a plurality of security levels. Each stack offload engine is associated with one security level of the plurality of security levels and is configured to access the memory portion corresponding to the associated security level. The security policy component is configured to route a network packet received via the physical network interface to a receiving stack offload engine of the stack offload engines based on a destination address and a security level associated with the network packet. The receiving stack offload engine provides an incoming message based on the network packet to a software application via the memory portion the receiving stack offload engine is configured to access In another aspect, method for use in secure network communication is provided. The method includes receiving by a physical network interface a network packet associated with a security level. The network packet is transmitted from the physical network interface to a security policy component. The network packet is routed to a stack offload engine by the security policy component based on a destination address associated with the network packet and the security level associated with the network packet. The network packet is provided by the stack offload engine to a software application via a memory portion of a plurality of memory portions. The memory portion corresponds to the security level.

In yet another aspect, a system for use in secure network communication is provided. The system includes a plurality of stack offload engines and a security policy component coupled to the stack offload engines. Each stack offload engine is associated with a security level and is configured to access a memory portion corresponding to the associated security level and to not access one or more memory portions that do not correspond to the associated security level. The security policy component is configured to receive a network packet associated with a destination address and a security level, and to select a stack offload engine of the plurality of stack offload engines that is associated with the destination address and the security level associated with the network packet. The security policy component is also configured to route the network packet to the selected stack offload engine. The selected stack offload engine communicates the network packet to a software application via the memory portion associated with the security level that is associated with the selected stack offload engine.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 2 is a block diagram of an exemplary system that may be used in secure network communication.

FIGS. 4A and 4B are a flowchart of an exemplary method for transmitting network packets that may be used with the system shown in FIG. 2.

DETAILED DESCRIPTION

Figure 1:
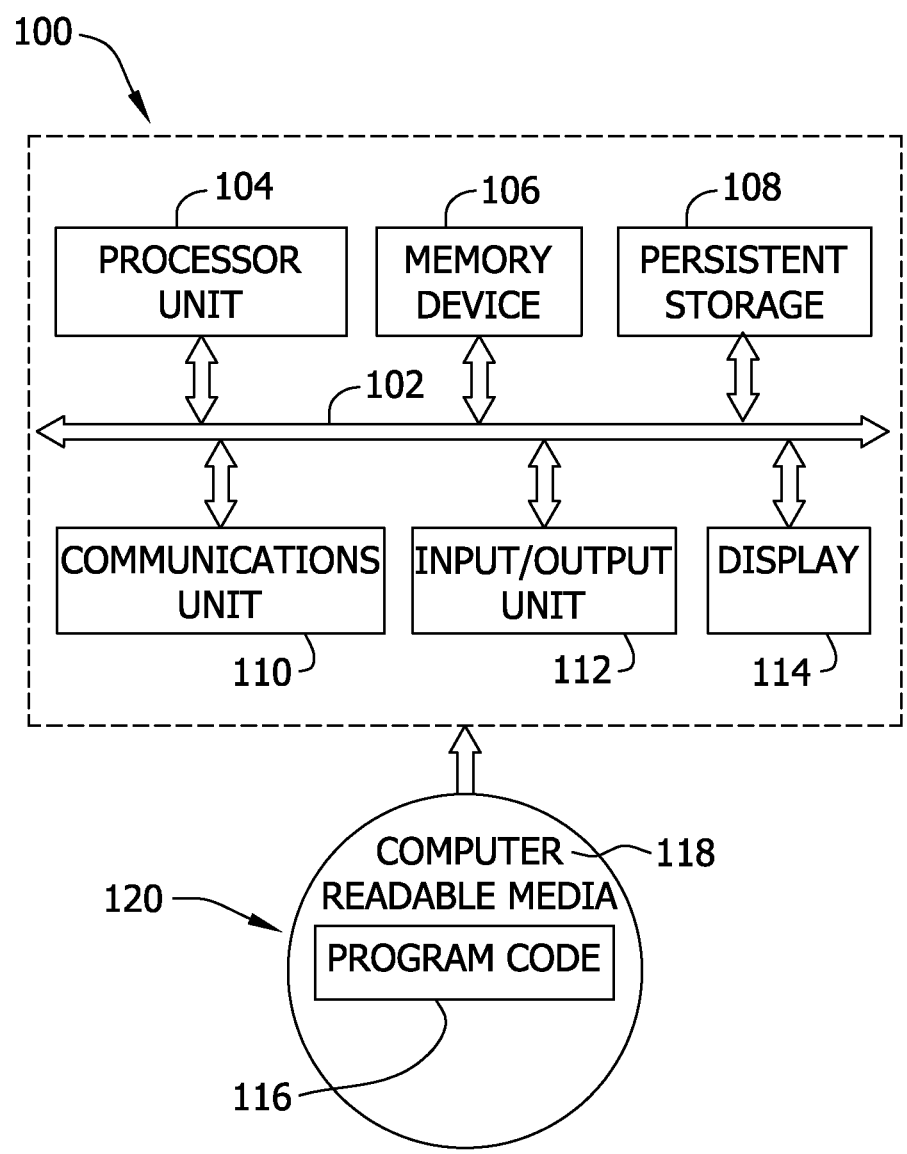
FIG. 1 is a block diagram of an exemplary computing device.

The described embodiments are directed to methods and apparatus that enforce a memory separation on a multiple independent levels of security (MILS) host processor, with separate offload engines and corresponding memory portions for each security level. In embodiments, a secure label is applied at the lowest layer of the network protocols. Application of this secure label ensures that security enforcing code is not associated with complex network protocols. Heretofore it has been difficult, if not impossible, to demonstrate enforcement of the separation policy to the satisfaction of evaluation methods applied to MILS based systems based on separation kernel (SK) real-time operating systems (RTOSs) in environments requiring high robustness.

Providing a secure communication path that incorporates a hardware offload of the network protocols, as described herein, facilitates reducing the amount of computing resources (e.g., processors and/or processor speed) utilized in connection with a given set of software applications. Accordingly, the embodiments described may provide increased performance (e.g., reduced system latency and/or increased system throughput) and may further reduce the size, weight, and power requirements (SWAP) associated with systems executing such software applications.

Multiple level network security can be achieved using trusted labels based on the Internet Engineering Task Force (IETF) Commercial Internet Protocol Security Option (CIPSO) Working Group efforts and Federal Information Processing Standards (FIPS) Publication 188. Multilevel security (MLS) input/output (IO) may be supported by an operating system, for example, at a medium assurance level (e.g., EAL4). However, such an approach does not provide multiple independent memory spaces that are robustly separated to prevent overt and/or covert information channels.

The tactical edge of the Global Information Grid (GIG) includes autonomous real-time applications hosted on real-time operating systems (RTOSs). High assurance (e.g., EAL6 and/or EAL7) systems that provide hardware offload and memory separation may be highly valuable to support MLS data separation in size, weight, and power (SWAP) constrained systems, and may facilitate increasing system performance in real-time (RT) contexts, such as tactical operations and/or surveillance systems.

Reducing the SWAP impact to provide MLS for tactical vehicles (e.g., manned and/or unmanned aircraft) facilitates reducing the impact to and/or maintaining weight constraints on such platforms so that they may accommodate desired payloads and/or fuel, maintain range, and/or maintain system effectiveness. Further, embodiments described herein enforce a security policy to maintain separation of security in the network. For example, the security policy may maintain separation between data streams associated with different security levels based on labels assigned to individual packets exchanged between a MILS partition and the network Additionally, an MLS communications unit may apply explicit trusted labels based on security level policy assigned to the partitions that are allowed access to the communications unit's memory space. The MLS communications unit may also enforce the information flow from the network to the user partition in accordance with the policy assigned to the security label. Security labels may be standards based and open with a path towards broad applicability.

FIG. 1 is a block diagram of an exemplary computing device 100. In the exemplary embodiment, computing device 100 includes communications fabric 102 that provides communications between a processor unit 104, a memory device 106, persistent storage 108, a communications unit 110, an input/output (I/O) unit 112, and a presentation interface, such as a display 114. In addition to, or in alternative to, the presentation interface may include an audio device (not shown) and/or any device capable of conveying information to a user.

Processor unit 104 executes instructions for software that may be loaded into memory device 106. Processor unit 104 may be a set of one or more processors or may include multiple processor cores, depending on the particular implementation. Further, processor unit 104 may be implemented using one or more heterogeneous processor systems in which a main processor is present with secondary processors on a single chip. In another embodiment, processor unit 104 may be a homogeneous processor system containing multiple processors of the same type.

Memory device 106 and persistent storage 108 are examples of storage devices. As used herein, a storage device is any piece of hardware that is capable of storing information either on a temporary basis and/or a permanent basis. Memory device 106 may be, for example, without limitation, a random access memory and/or any other suitable volatile or non-volatile storage device. Persistent storage 108 may take various forms depending on the particular implementation, and persistent storage 108 may contain one or more components or devices. For example, persistent storage 108 may be a hard drive, a flash memory, a rewritable optical disk, a rewritable magnetic tape, and/or some combination of the above. The media used by persistent storage 108 also may be removable. For example, without limitation, a removable hard drive may be used for persistent storage 108.

A storage device, such as memory device 106 and/or persistent storage 108, may be configured to store data for use with the processes described herein. For example, a storage device may store computer-executable instructions, executable software components (e.g., event processor components, complex event processing components, machine learning components, and decision support components), data received from data sources, events, user-defined policies, artificial intelligence (AI) event correlation models, and/or any other information suitable for use with the methods described herein.

Communications unit 110, in these examples, provides for communications with other computing devices or systems. In exemplary embodiments, communications unit 110 includes one or more network interface cards. Communications unit 110 may provide communications through the use of physical and/or wireless communication links.

Input/output unit 112 enables input and output of data with other devices that may be connected to computing device 100. For example, without limitation, input/output unit 112 may provide a connection for user input through a user input device, such as a keyboard and/or a mouse. Further, input/output unit 112 may send output to a printer. Display 114 provides a mechanism to display information to a user. For example, a presentation interface such as display 114 may display a graphical user interface, such as those described herein.

Instructions for the operating system and applications or programs are located on persistent storage 108. These instructions may be loaded into memory device 106 for execution by processor unit 104. The processes of the different embodiments may be performed by processor unit 104 using computer implemented instructions and/or computer-executable instructions, which may be located in a memory, such as memory device 106. These instructions are referred to herein as program code (e.g., object code and/or source code) that may be read and executed by a processor in processor unit 104. The program code in the different embodiments may be embodied on different physical or tangible computer readable media, such as memory device 106 or persistent storage 108.

Program code 116 is located in a functional form on computer readable media 118 that is selectively removable and may be loaded onto or transferred to computing device 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computing device 100. The tangible form of computer readable media 118 is also referred to as computer recordable storage media. In some instances, computer readable media 118 may not be removable.

Alternatively, program code 116 may be transferred to computing device 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another computing device or computer system for use within computing device 100. For instance, program code stored in a computer readable storage medium in a server computing device may be downloaded over a network from the server to computing device 100. The computing device providing program code 116 may be a server computer, a workstation, a client computer, or some other device capable of storing and transmitting program code 116.

Program code 116 may be organized into computer-executable components that are functionally related. For example, program code 116 may include an event processor component, a complex event processing component, a machine learning component, a decision support component, and/or any component suitable for the methods described herein. Each component may include computer-executable instructions that, when executed by processor unit 104, cause processor unit 104 to perform one or more of the operations described herein.

The different components illustrated herein for computing device 100 are not meant to provide architectural limitations to the manner in which different embodiments may be implemented. The different illustrative embodiments may be implemented in a computer system including components in addition to or in place of those illustrated for computing device 100. For example, other components shown in FIG. 1 can be varied from the illustrative examples shown.

As one example, a storage device in computing device 100 is any hardware apparatus that may store data. Memory device 106, persistent storage 108 and computer readable media 118 are examples of storage devices in a tangible form.

In another example, a bus system may be used to implement communications fabric 102 and may include one or more buses, such as a system bus or an input/output bus. Of course, the bus system may be implemented using any suitable type of architecture that provides for a transfer of data between different components or devices attached to the bus system. Additionally, a network interface may include one or more devices used to transmit and receive data, such as a modem or a network adapter. Further, a memory may be, for example, without limitation, memory device 106 or a cache such as that found in an interface and memory controller hub that may be present in communications fabric 102.

Figure 3A:
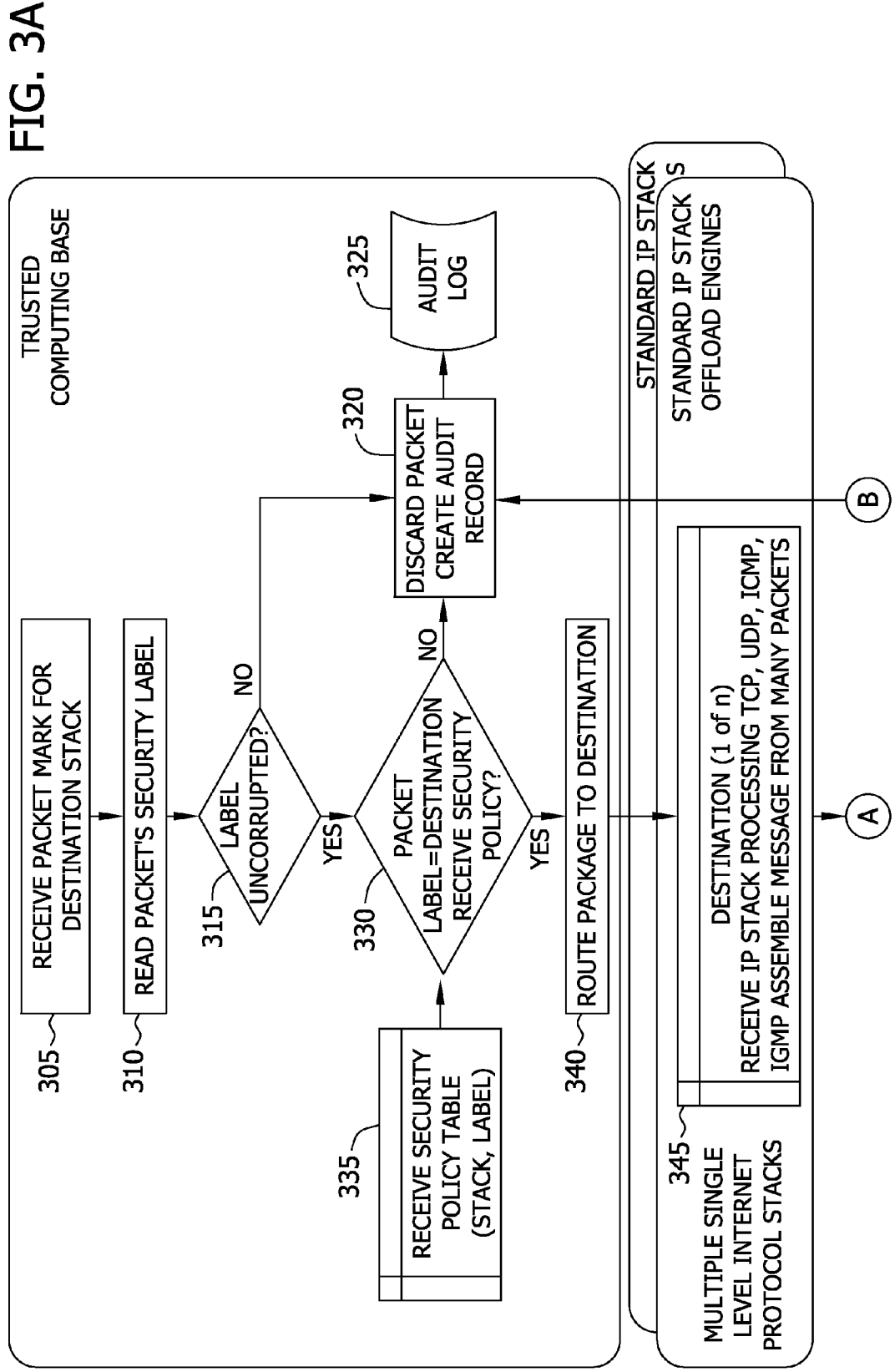
FIGS. 3A and 3B are a flowchart of an exemplary method for receiving network packets that may be used with the system shown in FIG. 2.
Figure 3B:
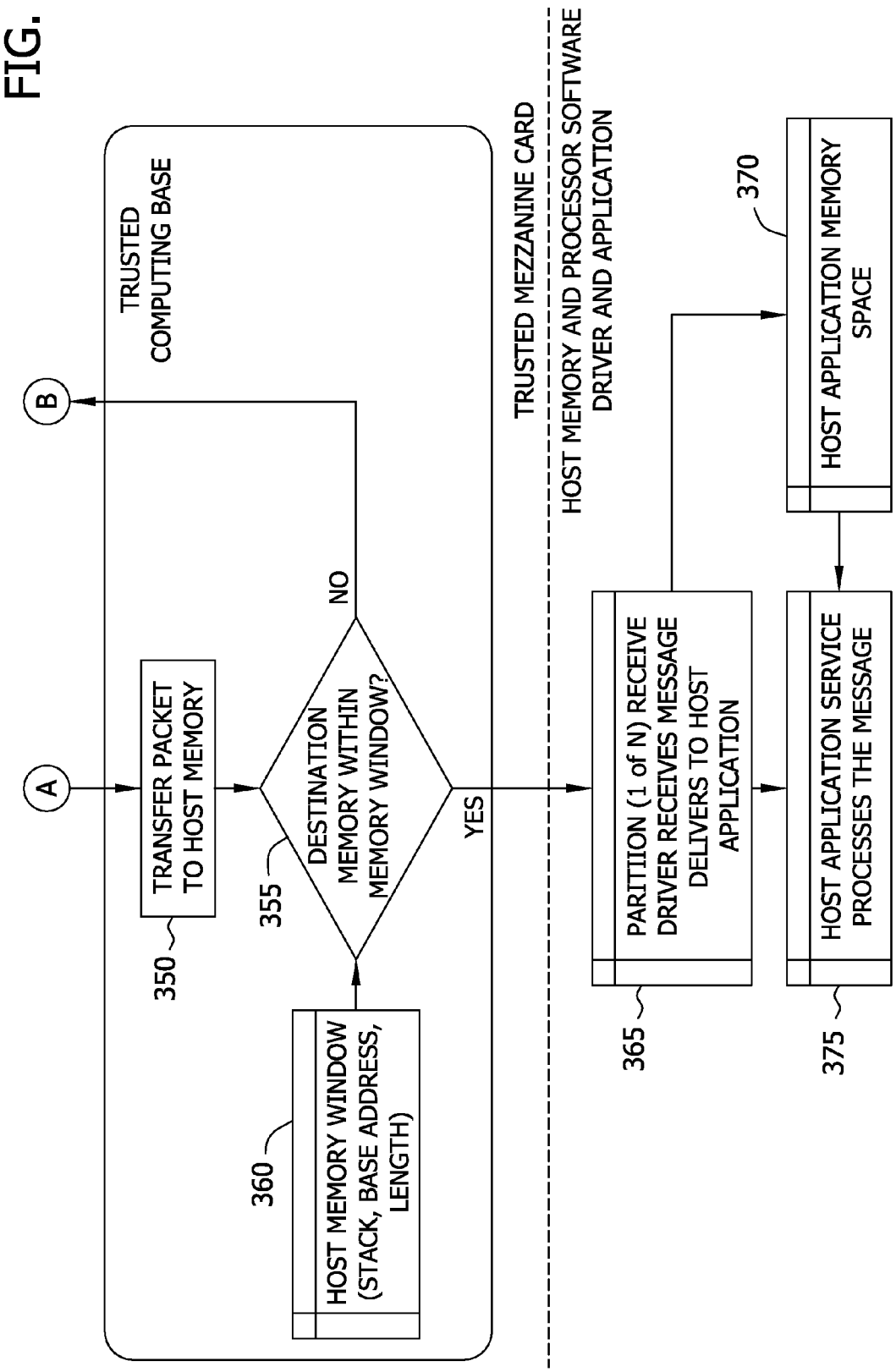

FIG. 2 is a block diagram of an exemplary system 200 that may be used in secure network communication. System 200 includes hardware components (e.g., computing device 100, shown in FIG. 1) and software components (e.g., executed by computing device 100), as described in more detail below. FIGS. 3A and 3B are a flowchart of an exemplary method 300 for receiving network packets using system 200. FIGS. 4A and 4B are a flowchart of an exemplary method 400 for transmitting network packets using system 200.

Referring to FIG. 2, in exemplary embodiments, communications unit 110 includes one or more physical network interfaces 205 (e.g., wired and/or wireless network adapters) that are configured to communicate with one or more other computing devices 100 via a network. Communications unit 110 also includes a security policy component 210 that is coupled to physical network interfaces 205, a plurality of stack offload engines 215 that are coupled to security policy component 210, and a trusted memory interface (TMI) 218 that is coupled to stack offload engines 215 and memory device 106.

A memory device 106 includes a plurality of memory portions 220, each of which corresponds to one security level of a plurality of security levels. Memory portions 220 may be physically separated (e.g., as discrete hardware devices) and/or logically separated (e.g., by a separation kernel executed by one or more processor units 104, shown in FIG. 1). Each stack offload engine 215 is also associated with a security level and is configured to access memory device 106 via TMI 218. In exemplary embodiments, security policy component 210 facilitates enforcing any host memory segregation scheme that is based on addresses (e.g., network addresses).

In exemplary embodiments, security policy component 210 transfers data between stack offload engines 215 and the network (e.g., via physical network interface(s) 205), restricting data transfers based on one or more memory access security policies (e.g., the Bell-LaPadula security model). For example, security policy component 210 may generally prohibit inter-level access, such as by preventing the routing of a network packet to a stack offload engine 215 associated with a security level other than the security level associated with the network packet. In some embodiments, security policy component 210 allows for inter-level access when specific conditions are satisfied. Such conditions may be based on the source of an incoming message, the destination of an incoming message, the type of incoming message, and/or any other characteristic suitable for distinguishing one message from another. It is contemplated that security policy component 210 may be configured to enforce any security policy governing the exchange of data between stack offload engines 215 and the network.

In exemplary embodiments, communications unit 110 (e.g., security policy component 210 and/or TMI 218) allows limited inter-level access when communications unit 110 is handling a discovery request (e.g., an address discovery request and/or a service discovery request). For example, if a first socket application 225 is associated with a first security level, and security policy component 210 receives a discovery request from a local source (e.g., via a stack offload engine 215) or a remote source (e.g., via a physical network interface 205) associated with a second security level that is lower than the first security level, the discovery request may be passed to the first socket application 225, even though other incoming traffic from the same source may be prevented from reaching the socket application 225. Similarly, in such a scenario, the socket application 225 may be allowed to transmit routing information (e.g., including a network address and/or a port) associated with the socket application 225 or with another software application corresponding to the discovery request (e.g., a software application that provides a requested service), to a destination associated with the second security level (e.g., the source of the service discovery request).

System 200 also includes a plurality of software applications, such as socket applications 225, that are executed by processor unit 104 (shown in FIG. 1). Each socket application 225 is executed in a partition 230 that is associated with a security level and corresponds to the memory portion 220 that corresponds to this security level. Each socket application 225 communicates with external systems (e.g., other computing devices 100) via one or more sockets 235. An offload driver 240 executed within each partition 230 provides an interface between socket applications 225 (e.g., sockets 235) of the partition 230 and a stack offload engine 215 via corresponding memory portion 220. In some embodiments, processor unit 104 executes software applications (e.g., socket applications 225) with user level privileges, and communications unit 110 operates with system level privileges.

Processor unit 104 may be programmed to prevent each software application from accessing the memory portions 220 other than the memory portion 220 corresponding to the partition 230 in which the software application is executed. For example processing unit 104 may be programmed to restrict the exchange of data between socket applications 225 and memory partitions 220 in a manner similar to that described above with reference to TMI 218 and stack offload engines 215, such as by generally or strictly preventing inter-security level access.

Referring to FIGS. 2 and 3, in exemplary embodiments, a physical network interface 205 receives 305 an incoming network packet that is associated with a security level. Physical network interface 205 transmits the incoming network packet to security policy component 210.

Security policy component 210 marks the incoming network packet for a destination stack (e.g., a stack offload engine 215) based at least in part on a destination address associated with the incoming network packet and/or a network protocol associated with the incoming network packet. Security policy component 210 may also verify that the security level associated with the incoming network packet matches the security level associated with the destination stack.

In some embodiments, security policy component 210 may mark an incoming packet for a plurality of destinations. For example, the packet may be associated with a multicast or broadcast destination address, and security policy component 210 may mark the packet for each stack offload engine 215 that corresponds to the multicast or broadcast address.

In exemplary embodiments, security policy component 210 reads 310 a security label (e.g., a security label corresponding to Federal Information Processing Standards Publication 188) that is included in the incoming network packet. Security policy component 210 determines 315 whether the security label is valid (e.g., uncorrupted). If the security label is not valid, security policy component 210 discards 320 the packet and creates an audit record in an audit log 325. If the security label is valid, security policy component 210 determines 330 whether the security packet label matches a receive security policy associated with the destination of the incoming network packet. For example, security policy component 210 may read (e.g., from a storage device) a receive security policy table 335 that associates each stack offload engine 215 with a security label. In such a scenario, security policy component 210 may determine 330 whether the security packet label matches a receive security policy by determining whether the security label of the incoming network packet matches the security label associated with the destination stack offload engine 215.

If the security label does not match the policy, security policy component 210 discards 320 the incoming network packet and creates an audit record, as described above. Otherwise, security policy component routes 340 the incoming network packet to the destination stack offload engine(s) 215.

The destination stack offload engine 215 (or each destination stack offload engine 215, in the case of a multicast or broadcast destination address) receives 345 the incoming network packet and creates an incoming message based at least in part on the incoming network packet. In some cases, the incoming message is communicated by a plurality of packets, and stack offload engine 215 creates the incoming message based on such packets.

The destination stack offload engine 215 transfers 350 the incoming network packet(s) and/or the incoming message to memory device 106 via TMI 218. In exemplary embodiments, the destination stack offload engine 215 provides the incoming packets and/or message to TMI 218 along with a destination memory portion 220. TMI determines 355 whether the destination memory portion 220 is within a memory window that the destination stack offload engine 215 is authorized to access. For example, TMI 218 may access host memory window data 360 indicating a memory window (e.g., a base address and a length) associated with each stack offload engine 215. Host memory window data 360 may be stored within communications unit 110.

If the destination memory portion 220 is not within an authorized memory window, TMI 218 discards 320 the incoming network packet(s) and/or incoming message and creates an audit record, as described above. Otherwise, the incoming network packet(s) and/or incoming message are provided to the destination socket application 225. In exemplary embodiments, offload driver 240 of the partition 230 in which the destination socket application 225 executes receives 365 the incoming message and provides the incoming message to socket application 225 via a socket 235 opened by the socket application 225. In some embodiments, the incoming message is stored in host application memory space 370 (e.g., within memory device 106) that is associated with the socket application 225. Host application memory space 370 may include or be included in the memory portion 220 associated with the partition 230. The socket application 225 processes 375 the incoming message, such as by executing a transaction against data managed by socket application 225.

In some embodiment, method 300 is performed repeatedly (e.g., periodically, continuously, and/or upon request). Further, portions of method 300 may be performed concurrently. For example, stack offload engines 215 may process incoming network packets in parallel. In addition, or alternatively, system 200 may receive a plurality of incoming network packets and provide them to appropriate destination socket applications 225. For example, a first incoming network packet associated with a first security level may be routed 340 to one stack offload engine 215, whereas a second incoming network packet associated with a second security level may be routed 340 to another stack offload engine 215.

In some embodiments, system 200 includes redundant physical interfaces. In such embodiments, a plurality of physical network interfaces 205 are coupled to security policy component 210. Security policy component 210 is configured to receive incoming network packets via any of such physical network interface 205 and to route 340 such incoming network packets to an appropriate stack offload engine 215, as described above.

Referring to FIGS. 2 and 4, method 400 facilitates enforcing security policies when transmitting data from software application to a remote system. In exemplary embodiments, a socket application 225 processes 405 an outgoing message to transmit to a destination (e.g., a remote computing device 100). In some embodiments, the outgoing message is stored in host application memory space 370 (shown in FIGS. 3A and 3B) that is associated with the socket application 225, as described above with reference to method 300.

The outgoing message is provided to offload driver 240 via socket 235. Offload driver 240 requests 410 that the corresponding stack offload engine 215 send the outgoing message to the destination. In exemplary embodiments, communications unit 110 intercepts and validates the request 410, such as by determining 415 whether the outgoing message is stored within a memory window that the stack offload engine 215 is authorized to access. For example, TMI 218 may make such a determination 415 based on host memory window data 360, as described above with reference to method 300. If the outgoing message is not stored within an authorized memory window, the outgoing message is discarded 320, and an audit record is created in an audit log 325, as described above with reference to method 300. Otherwise, TMI 218 transfers 420 the outgoing message to the stack offload engine 215 corresponding to the partition 230 in which the transmitting socket application 225 is executed. This stack offload engine 215 may be referred to as a transmitting stack offload engine 215.

Transmitting stack offload engine 215 receives the outgoing message and transmits 425 one or more outgoing network packets based on the outgoing message to security policy component 210. For example, the message may be split across a plurality of network packets if the message is larger than a predetermine packet size.

Security policy component 210 receives the outgoing network packet(s) from transmitting stack offload engine 215. Security policy component 210 creates 430 a security label that represents the security level associated with transmitting stack offload engine 215. In exemplary embodiments, the security label is based on a transmit security policy table 435 that associates each stack offload engine 215 with a security label. Transmit security policy table 435 may be stored in communications unit 110. Security policy component 210 adds or "binds" 440 the security label to the outgoing network packet(s) and transmits 445 the outgoing network packet(s) to the destination.

While particular examples are described above with reference to communicating with remote sources and/or destinations, exemplary embodiments also facilitate processing communication between a local source and a local destination. For example, security policy component 210 may receive 305 (shown in FIG. 3A) a network packet associated with a source address indicating a local source (e.g., a socket application 225 in one partition 230) and a destination address indicating a local destination (e.g., a socket application 225 in another partition 230). Communications unit 110 may process such local traffic as described above with reference to FIGS. 3A, 3B, 4A, and 4B, with the exception of transmitting or receiving such traffic via a physical network interface 205. Rather, in exemplary embodiments, after binding 440 a security label to an outgoing packet, security policy component 210 identifies the destination address of the outgoing packet as a local destination and transmits 445 the packet by "looping back" the packet to security policy component 210 as an incoming packet, and proceeds to process the packet as described with reference to FIGS. 3A and 3B. Such embodiments facilitate reducing unnecessary latency and network traffic that may be incurred by transmitting 445 the packet to an external device (e.g., a router or a switch) and receiving 305 the packet from the external device.

Embodiments described herein facilitate providing hardware acceleration of network protocol processing and providing separation between memory portions associated with multiple security levels. Methods and systems provided enable evaluation of various components regardless of the actual network protocols used, such that overall testing and certification effort may be reduced. In addition, system performance (e.g., processing speed and/or network throughput) may be increased, and the utilization of general purpose processing resources (e.g., a central processing unit) may be lowered, reducing size, weight, and power (SWAP) requirements associated with such computing systems.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in secure network communication, said system comprising:
   a physical network interface configured to communicate with one or more computing devices via a network;
   a memory device comprising a plurality of memory portions, wherein each memory portion corresponds to a respective security level of a plurality of security levels;
   a trusted memory interface coupled to said memory device;
   a plurality of hardware-based stack offload engines coupled to said memory device by said trusted memory interface, wherein each hardware-based stack offload engine is associated with a respective security level of the plurality of security levels and is configured to access the memory portion corresponding to the associated security level; and
   a security policy component coupled to said physical network interface and said hardware-based stack offload engines, said security policy component configured to route a network packet received via said physical network interface to a receiving hardware-based stack offload engine of said hardware-based stack offload engines based on a destination address and a security level associated with the network packet, wherein the receiving hardware-based stack offload engine provides an incoming message based on the network packet to a software application via the memory portion said receiving hardware-based stack offload engine is configured to access, and said trusted memory interface determines whether the memory portion is within a memory window that said receiving hardware-based stack offload engine is authorized to access.

2. A system in accordance with claim 1, wherein said security policy component is further configured to verify that the receiving hardware-based stack offload engine is associated with the security level associated with the network packet.

3. A system in accordance with claim 2, wherein said security policy component is further configured to determine the security level associated with the network packet based at least in part on a security label included in the network packet.

4. A system in accordance with claim 1, wherein a transmitting hardware-based stack offload engine of said hardware-based stack offload engines is configured to:
receive an outgoing message from a software application;
validate the outgoing message based at least in part on whether the outgoing message is received from the memory portion that said transmitting hardware-based stack offload engine is configured to access; and
transmit an outgoing network packet based on the outgoing message to said security policy component.

5. A system in accordance with claim 4, wherein said security policy component is further configured to:
receive the outgoing network packet from said transmitting hardware-based stack offload engine; and
add a security label to the outgoing network packet, wherein the security label represents the security level associated with said transmitting hardware-based stack offload engine.

6. A system in accordance with claim 1, further comprising a processor unit coupled to said memory and programmed to execute a software application in each partition of a plurality of partitions, wherein each partition corresponds to a memory portion of the plurality of memory portions.

7. A system in accordance with claim 6, wherein said processor unit is further programmed to execute the software applications with user level privileges and not with system level privileges.

8. A system in accordance with claim 6, wherein said processor unit is further programmed to execute a first software application in a first partition of the plurality of partitions at least in part by:
executing a socket-based software application; and
executing an offload driver that provides an interface between the socket-based software application and the hardware-based stack offload engine that corresponds to the first partition.

9. A method for use in secure network communication, said method comprising:
receiving, by a physical network interface, a network packet associated with a security level;
transmitting the network packet from the physical network interface to a security policy component;
routing, by the security policy component, the network packet to a first hardware-based stack offload engine of a plurality of hardware-based stack offload engines through a trusted memory interface, said routing based on a destination address associated with the network packet and the security level associated with the network packet, wherein each hardware-based stack offload engine is associated with a respective security level of a plurality of security levels and is configured to access a respective memory portion of a memory device corresponding to the associated security level and the trusted memory interface is coupled to the memory device;
determining, by the trusted memory interface, whether the respective memory portion for the first hardware-based stack offload engine is within a respective memory window that the first hardware-based stack offload engine is authorized to access; and
providing, by the first hardware-based stack offload engine, the network packet to a software application via a memory portion of a plurality of memory portions, wherein the memory portion corresponds to the security level.

10. A method in accordance with claim 9, further comprising:
selecting the first hardware-based stack offload engine by the security policy component based on the destination address; and
verifying that the security level associated with the selected first hardware-based stack offload engine matches the security level associated with the network packet.

11. A method in accordance with claim 10, further comprising determining the security level associated with the network packet based on a security label included in the network packet.

12. A method in accordance with claim 9, wherein the network packet is a first network packet associated with a first security level, said method further comprising:
receiving by the physical network interface a second network packet associated with a second security level;
routing the second network packet to a second hardware-based stack offload engine based on the second security level.

13. A method in accordance with claim 9, wherein the network packet is a first network packet received by a first physical network interface and associated with a first security level, said method further comprising:
receiving by a second physical network interface a second network packet associated with a second security level; and
routing the second network packet to a second hardware-based stack offload engine based on the second security level and a destination address associated with the second network packet.

14. A method in accordance with claim 9, wherein the software application is a first software application of a plurality of software applications, said method further comprising executing the first software applications in a first partition corresponding to a first memory portion of a plurality of memory portions.

15. A method in accordance with claim 14, wherein a second hardware-based stack offload engine is configured to access a second memory portion of the plurality of memory portions, said method further comprising preventing the second hardware-based stack offload engine from accessing the first memory portion.

16. A system for use in secure network communication, said system comprising:
a memory device;
a trusted memory interface coupled to said memory device;
a plurality of hardware-based stack offload engines coupled to said memory device by said trusted memory interface, each hardware-based stack offload engine associated with a respective security level and configured to access a respective memory portion corresponding to the associated security level and to not access one or more memory portions that do not correspond to the associated security level, said trusted memory interface configured to determine whether each respective memory portion is within a respective memory window that each respective hardware-based stack offload engine is authorized to access; and
a security policy component coupled to said hardware-based stack offload engines and configured to:
receive a network packet associated with a destination address and a security level;
select a hardware-based stack offload engine of the plurality of hardware-based stack offload engines that is associated with the destination address and the security level associated with the network packet; and
route the network packet to the selected hardware-based stack offload engine, wherein the selected hardware-based stack offload engine communicates the network packet to a software application via the memory portion associated with the security level that is associated with the selected hardware-based stack offload engine.

17. A system in accordance with claim 16, wherein said security policy component is further configured to determine the security level associated with the network packet based on a security label included in the network packet.

18. A system in accordance with claim 16, further comprising a physical network interface coupled to said security policy component and configured to:
   receive the network packet from a computing device; and
   forward the network packet to said security policy component.

19. A system in accordance with claim 18, wherein said physical network interface is a first physical network interface configured to receive a first network packet, said system further comprising a second physical network interface coupled to said security policy component and configured to:
   receive a second network packet from a computing device; and
   forward the second network packet to said security policy component.

20. A system in accordance with claim 16, wherein the network packet is an incoming network packet, and wherein said security policy component is further configured to:
   receive an outgoing network packet from a transmitting hardware-based stack offload engine of the plurality of hardware-based stack offload engines, wherein the outgoing network packet is received by said transmitting hardware-based stack offload engine via the memory portion that said transmitting hardware-based stack offload engine is configured to access;
   add a security label to the outgoing network packet, wherein the security label represents the security level associated with said transmitting hardware-based stack offload engine.

21. A system in accordance with claim 16, wherein said security policy component is configured to receive the network packet by receiving a network packet associated with a source address indicating a local source and a destination address indicating a local destination.

22. A system in accordance with claim 16, wherein the software application is associated with a first security level, and the security policy component is configured to allow the software application to transmit routing information associated with the software application to a destination associated with a second security level that is lower than the first security level, wherein the routing information includes a network address.

* * * * *